United States Patent
Reichart et al.

(10) Patent No.: US 9,050,746 B2
(45) Date of Patent: Jun. 9, 2015

(54) IMD MOLD, INJECTION MOLDING APPARATUS HAVING SUCH AN IMD MOLD AND METHOD FOR PRODUCING A FILM-DECORATED PLASTIC PART

(75) Inventors: Marc Reichart, Nürnberg (DE); Werner Gubesch, Langenzenn (DE)

(73) Assignee: HBW-Gubesch Kunststoff-Engineering GmbH, Emskirchen (DE)

( * ) Notice: Subject to any disclaimer, the term of this patent is extended or adjusted under 35 U.S.C. 154(b) by 572 days.

(21) Appl. No.: 13/435,208

(22) Filed: Mar. 30, 2012

(65) Prior Publication Data

US 2012/0200003 A1    Aug. 9, 2012

Related U.S. Application Data

(63) Continuation of application No. PCT/EP2010/005937, filed on Sep. 29, 2010.

(30) Foreign Application Priority Data

Sep. 30, 2009  (DE) .................... 10 2009 043 581

(51) Int. Cl.
- B29C 45/14  (2006.01)
- B29C 45/56  (2006.01)
- B29C 33/18  (2006.01)

(52) U.S. Cl.
CPC .......... B29C 45/14688 (2013.01); B29C 33/18 (2013.01); B29C 45/14016 (2013.01); B29C 45/14065 (2013.01); B29C 45/1418 (2013.01); B29C 45/14262 (2013.01); B29C 45/14827 (2013.01); B29C 45/56 (2013.01); B29C 2045/14286 (2013.01)

(58) Field of Classification Search
CPC .................. B29C 45/14016; B29C 45/14065; B29C 45/14262
See application file for complete search history.

(56) References Cited

U.S. PATENT DOCUMENTS

| | | | |
|---|---|---|---|
| 4,075,266 A * | 2/1978 | Theysohn | 264/550 |
| 6,436,329 B1 * | 8/2002 | Hardgrove et al. | 264/266 |
| 6,596,218 B2 | 7/2003 | Klotz | |
| 6,783,718 B2 | 8/2004 | Blanchon et al. | |
| 7,641,843 B2 | 1/2010 | Taemmerich et al. | |
| 7,887,741 B2 * | 2/2011 | Kato et al. | 264/509 |
| 8,236,231 B2 | 8/2012 | Ferguson et al. | |
| 2007/0141353 A1 | 6/2007 | Neitzke | |
| 2007/0184148 A1 * | 8/2007 | Toyooka et al. | 425/542 |
| 2009/0072442 A1 * | 3/2009 | Chang | 264/275 |

FOREIGN PATENT DOCUMENTS

| | | |
|---|---|---|
| DE | 19843921 A1 | 3/2000 |
| DE | 102004036171 A1 | 3/2006 |
| DE | 60111966 T2 | 4/2006 |
| DE | 102007007409 A1 | 8/2008 |
| JP | 63139717 A | 6/1988 |
| JP | 3124416 A | 5/1991 |
| JP | 3236920 A | 10/1991 |
| JP | 5024070 A | 2/1993 |
| JP | 2000006199 A | 1/2000 |
| JP | 2009279849 A | 12/2009 |
| WO | 2008157592 A1 | 12/2008 |

OTHER PUBLICATIONS

International Search Report of PCT/EP2010/005937, Dated Mar. 18, 2011.

* cited by examiner

*Primary Examiner* — James Sanders
(74) *Attorney, Agent, or Firm* — Laurence A. Greenberg; Werner H. Stemer; Ralph E. Locher

(57) ABSTRACT

An IMD mold for producing a foil-decorated plastic part contains a half mold facing the foil and a half mold facing away from the foil. The two half molds can be placed on each other with corresponding mold dividing surfaces so as to form a cavity, which is substantially closed off from the outside, therebetween. At least the mold dividing surface of the half mold facing the foil is formed by an inner area surrounding the cavity and an outer area in turn surrounding the inner area. The mold dividing surface in the outer area lies in an at least substantially flat or one-dimensionally curved mold dividing plane, and the mold dividing surface in the inner area is or can be set back with respect to the mold dividing plane.

9 Claims, 4 Drawing Sheets

IMD MOLD, INJECTION MOLDING APPARATUS HAVING SUCH AN IMD MOLD AND METHOD FOR PRODUCING A FILM-DECORATED PLASTIC PART

CROSS-REFERENCE TO RELATED APPLICATION

This is a continuation application, under 35 U.S.C. §120, of copending international application No. PCT/EP2010/005937, filed Sep. 29, 2010, which designated the United States; this application also claims the priority, under 35 U.S.C. §119, of German patent application No. DE 10 2009 043 581.6, filed Sep. 30, 2009; the prior applications are herewith incorporated by reference in their entirety.

BACKGROUND OF THE INVENTION

Field of the Invention

The invention relates to an IMD mold for producing a film-decorated plastic part, containing a half mold facing the film and a half mold facing away from the film, wherein the two half molds can be placed on each other with corresponding mold parting surfaces so as to form between them a cavity which is closed off from the outside. Such an IMD mold is known, for example, from published, non-prosecuted German patent application DE 10 2007 007 409 A1. The invention also relates to an injection molding apparatus having such an IMD mold and to a method for producing a film-decorated plastic part with the aid of such an injection molding apparatus.

Film-decorated plastic parts are generally produced as injection-molded parts that are provided with a decorative coating, which may have a relief-like surface structure. The coating is applied, for example, by what is known as the in-mold decoration (IMD) technique. In the IMD technique, the coating is first applied to a peelable, flat backing film. The backing film with the coating is simply referred to hereafter as a film. The film is inserted into the open IMD mold, so that the coating faces inward, toward the half mold facing away from the film. When the IMD mold is closed, the film is clamped in between the two half molds of the IMD mold in the region of the mold parting surfaces lying against each other. Polymer is then injected behind the film, it being pressed against the half mold facing the film under the injection pressure exerted by the polymer melt. The film is thereby stretched. During the injection molding process, the coating bonds with the cooling polymer melt. During or after the opening of the IMD mold (demolding), the backing film is peeled off from the coating, which then forms the visible surface of the injection-molded article.

As an alternative to the IMD technique, there is what is known as insert molding. In insert molding, the coating is applied to an insert film that is much thicker in comparison with IMD films, and therefore dimensionally stable to a certain extent. The insert film provided with the coating is thermoformed, cut and laminated by injecting polymer. The insert film is in this case in the finished injection-molded part, sandwiched between the coating and the body of plastic.

One disadvantage of the conventional IMD technique is that IMD films can only be stretched to a comparatively small extent, typically up to about 30%. Plastic parts with strong 3D structuring of the visible surface therefore cannot be decorated by the IMD technique, especially since in such cases the film tends to become folded or even tear. With insert molding, it is true that in principle even comparatively highly contoured articles can be decorated. However, this technique is much more expensive than the IMD method.

SUMMARY OF THE INVENTION

The invention is based on the object of making improved production of film-decorated plastic parts with highly contoured surfaces possible by the IMD technique.

The object is achieved according to the invention by an IMD mold for producing a film-decorated plastic part. The IMD mold contains a half mold facing the film and a half mold facing away from the film. The two half molds can be placed on each other with corresponding mold parting surfaces so as to form between them a cavity which is substantially closed off from the outside. At least on the half mold facing the film, the film parting surface is formed here by an inner region, surrounding the cavity, and an outer region, in turn surrounding the inner region. In the outer region, the mold parting surface lies in a flat or one-dimensionally curved mold parting plane. In the inner region, on the other hand, the mold parting surface of the half mold facing the film is set back or can be set back from this mold parting plane.

"Facing the film" refers here to that half mold on which the IMD film is placed in the intended way before or during the injecting operation. The side of the IMD mold assigned to this half mold is subsequently also referred to as the "demolding side". "Facing away from the film", on the other hand, refers to that half mold from which the IMD film is laminated by injecting. The side of the IMD mold assigned to this half mold is therefore also referred to as the "injecting side".

In particular in the case of embodiments—preferred on account of their simplicity—of the IMD mold according to the invention in which the half mold facing the film forms a rigid unit, at least in the region of the mold parting surface, the mold parting surface is "set back" in the inner region. In this case, the half mold facing away from the film has a film parting surface of a complementary design, with an outer region and an inner region protruding beyond the outer region.

As an alternative to this, however, also conceivable within the scope of the invention are IMD molds in which the half mold facing the film is of a multi-part construction, so that the inner region and the outer region of the mold parting surface (or at least part of the latter) are formed on different parts of this half mold. The two parts are in this case movable with respect to each other in such a way that the inner region of the mold parting surface can be reversibly "set back" from the outer region.

The object is also achieved according to the invention by an injection molding apparatus having such an IMD mold, having means for moving the mold in a moving direction between a closed position and an open position and having means for inserting an IMD film between the half molds.

Moreover, the object is achieved by a method for producing a film-decorated plastic part in which, according to the invention, such an injection molding apparatus is used.

Both configurational variants of the IMD mold that are described above achieve the effect that, when it is inserted into the IMD mold, the IMD film initially rests only on the outer region of the mold parting surface of the half mold facing the film, while it extends freely over the inner region of this mold parting surface. Therefore, the film can stretch freely over the entire surface area enclosed by the outer region, consequently over a surface area that exceeds the cross section of the cavity, whereby local instances of over-stretching, with resultant formation of tears or folds, are effectively avoided. This is of particular advantage in the case of variants of the injection molding method in which, before the closing of the mold, the film is heated and/or drawn into the half mold facing the film—in particular by negative pressure.

Correspondingly, a heating device, in particular in the form of an infrared (IR) heater or a hot-air blower, which in the open position of the mold can be moved between the half molds for heating the film, is preferably provided as part of the injection molding apparatus according to the invention.

In addition or as an alternative to this, the mold and/or the injection molding apparatus has/have means for generating a negative pressure between the half mold facing the film and the IMD film. On the mold side, these means are formed in particular by vacuum channels, which open out into the cavity wall or the vicinity thereof, and in this case in particular into the inner region of the mold parting surfaces. "Negative pressure" refers here generally to a negative pressure difference between the side of the film on the demolding side and the side of the film on the injecting side. This negative pressure is preferably generated by generating a vacuum, that is to say a pressure lowered with respect to atmospheric pressure. The negative pressure may, however, alternatively or additionally also be generated by application of an air pressure increased with respect to atmospheric pressure to the side of the film on the injecting side. The application of such a positive pressure from the injecting side is advantageous in particular in the case of highly contoured cavity surfaces for making the film bear exactly against the cavity wall on the demolding side, especially since pressure differences that far exceed atmospheric pressure can be generated by positive pressure application—unlike by simply generating a vacuum.

In conjunction with heating the film, the configuration of the IMD mold according to the invention has the advantage in particular that the film extending freely over both the cavity and the inner region of the mold parting surface is heated in this entire surface region to temperatures that far exceed the temperature of the mold (generally about 70° C.). This is so because the film inserted into the mold initially only comes into contact with the outer region of the mold parting surfaces, so that heat dissipation from the film into the mold also only occurs in this region. On account of the absence of thermal coupling with the mold, within the surface area enclosed by the outer region of the mold parting surface the film also retains this increased temperature for a particularly long time, in particular until the stretching of the film. The temperature-dependently increased plasticity of the film thereby reduces further the risk of folds or tears forming.

During the thermoforming of the film, particularly uniform stretching of the film takes place over the entire wall region of the half mold on the demolding side that is enclosed by the outer periphery of the collar. Consequently—in comparison with conventional IMD molds, in which the film is stretched substantially exclusively in the region of the cavity—with given contouring of the surface of the cavity the local stretching of the film per unit area is reduced significantly. As a result, the risk of folds or tears forming in the film is likewise further reduced.

In a preferred embodiment of the invention, the mold parting surface of the half mold facing the film forms in the inner region a collar which is set at a slope in relation to the mold parting plane. The collar preferably forms a cross-sectionally straight slope with a constant setting angle along the gradient. As an alternative to this, however, the collar may also be curved in cross section (concavely or convexly). In addition or alternatively, one or more steps or offsets may be provided in the region of the collar. In particular, within the scope of the invention such an offset may be provided between the collar and the cavity.

The sloping shape of the wall has the effect that the collar of the half mold facing the film forms a funnel-like structure, which tapers toward the demolding side. On the demolding side, the mold parting surface therefore forms a concave shape in the region of the collar. The mold parting surface on the injecting side is preferably designed to complement this. The mold parting surface of the half mold facing away from the film consequently forms a convex structure in the region of the collar. Thanks to the sloping collar, on the demolding side the mold parting surfaces go over at the inner periphery of the collar into the wall of the cavity entirely by way of obtuse angles. Consequently, sharp and well-defined edges are avoided at the inner periphery of the mold parting surface on the demolding side. As a result, the film is also bent over comparatively little at the inner periphery of the mold parting surface, and is correspondingly subjected to little stress. Moreover, the reduced edge definition at the inner periphery of the mold parting surfaces allows the film to "work" better in this region. In particular, the film can stretch better over the surface area assigned to the cavity and thus compensate better for isolated stress peaks. These effects significantly reduce the risk of folds or tears forming in the film, whereby even plastic parts with a comparatively highly contoured visible surface can be decorated by the IMD method.

However, in comparison with conventional IMD molds, the mold design according to the invention causes increased film consumption, especially since the film is also stretched in the inner region of the mold parting surfaces, and consequently becomes scrap. This extra film consumption is all the more significant the wider the inner region is made. In order on the one hand to make effective use of the advantages of the mold design according to the invention, but on the other hand to keep the extra film consumption within acceptable limits, it has been found to be particularly advantageous to choose the ratio of the surface area enclosed by the outer periphery of the inner region to the surface area enclosed by the inner periphery of the inner region, i.e. to the cross-sectional area of the cavity, between approximately 1.75 and 4.

In the case of embodiments of the mold in which the inner region of the mold parting surfaces is formed by a collar set at a slope, it has also been found to be particularly advantageous for the same reasons to choose the setting angle of the collar with respect to the mold parting plane between 10° and 40°.

In order to achieve optimum adaptation of the stretching properties of the film to the complex geometry of the plastic part to be produced with as little film consumption as possible, according to a further preferred configuration the amount of the setting angle varies around the circumference of the collar. The amount of the setting angle is therefore generally chosen differently at different points around the circumference of the collar for one and the same plastic part, depending on the geometry of the cavity. Similarly, the distance between the outer periphery and the inner periphery of the inner region or collar generally varies around the circumference of the cavity.

To form windows or depressions in the material of the plastic part, one or more projections (for example in the form of what are known as core pins) are generally arranged in the cavity on the demolding side. These projections may be elevations on the base of the cavity that are fixedly connected to the half mold. However, these projections may also be mold punches, which are movable with respect to the half mold. If the half mold on the demolding side has at least one such projection, the inner region of the mold parting surface on the demolding side is set back or can be set back from the outer region preferably in such a way that the surface area enclosed by the outer region is not passed through by the projection. In other words, the height of the outer periphery of the inner region with respect to the base of the wall of the cavity on the demolding side is therefore dimensioned in such a way that it exceeds the height of the or each projection—measured with respect to the same point of reference. This design feature achieves the effect that the film inserted between half molds initially does not rest on the projection, so that in this region there is likewise no heat dissipation from the film to the mold, and uniform stretching of the film is ensured.

The injection molding apparatus preferably additionally has means for clamping in the IMD film, in particular a clamping frame. These means are arranged here in the outer region of the mold parting surfaces, while corresponding means are not provided in the inner region (in particular in the region of the collar that is optionally present). Thanks to the arrangement of the clamping means in the outer region, the film can stretch in an unrestricted manner over the entire inner region of the mold parting surfaces.

Other features which are considered as characteristic for the invention are set forth in the appended claims.

Although the invention is illustrated and described herein as embodied in an IMD mold, an injection molding apparatus having such an IMD mold and a method for producing a film-decorated plastic part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, parts that act in the same way are provided with the same designations.

Figure 1:
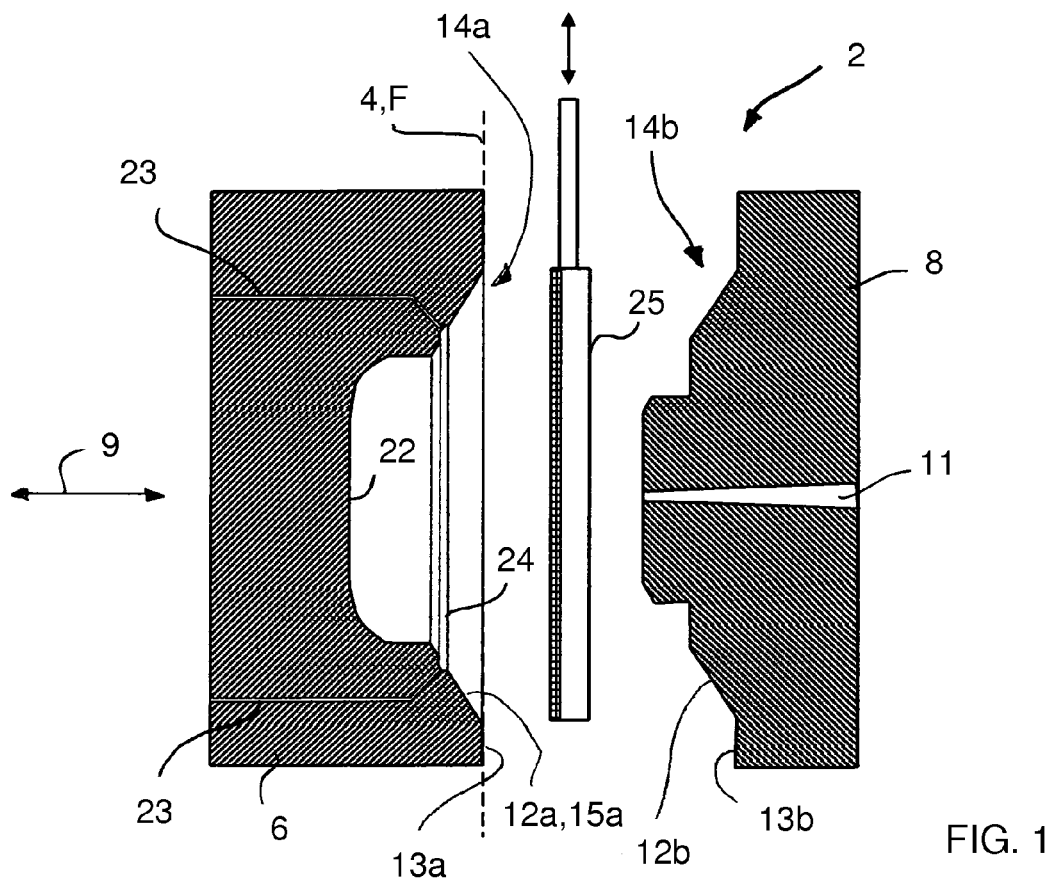
FIG. 1 is a diagrammatic, cross-sectional view of an IMD mold according to the invention, in an open position.
Figure 2:
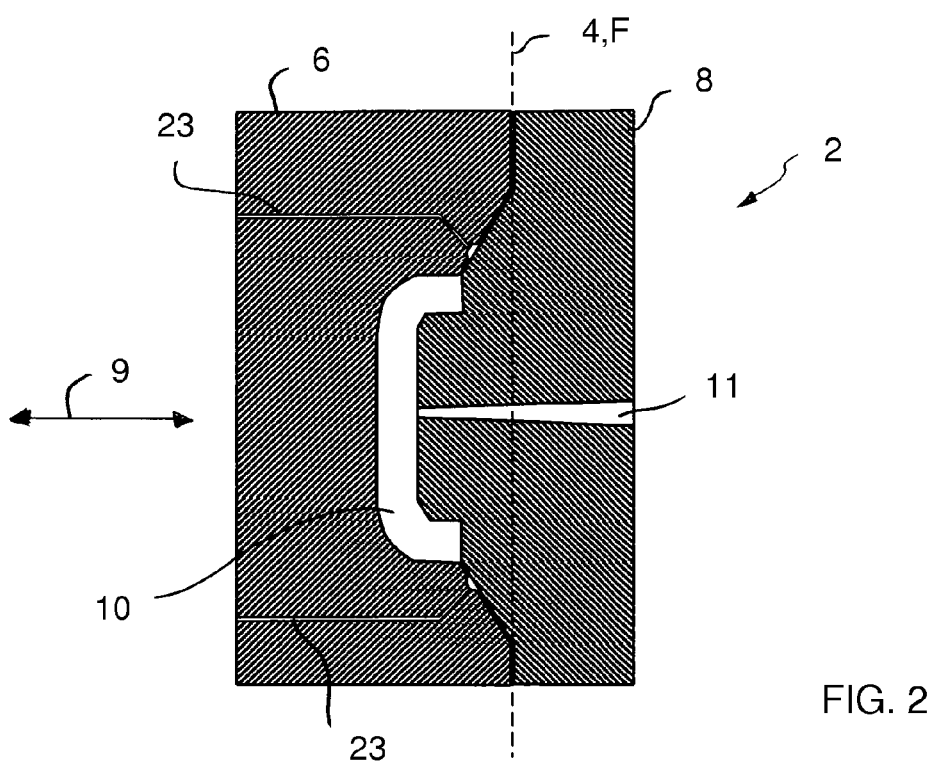
FIG. 2 is a cross-sectional view of the IMD mold, in a closed position.

Referring now to the figures of the drawing in detail and first, particularly, to FIGS. 1 and 2 thereof, there is shown an in-mold-decoration (IMD) mold 2 of an injection molding apparatus that is not shown in any more detail and is shown in an open position (FIG. 1) and a closed position (FIG. 2) respectively. The IMD mold 2 is used for producing a plastic part of which the visible surface is provided with a decorative coating. The coating is applied by the in-mold-decoration technique by a backing film to which the coating has been applied. The backing film forms together with the coating a stretchable film 4, which in the open position of the IMD mold 2 is placed in front of a half mold 6 on the demolding side of the mold 2. In the preferred embodiment, the film 4 is a "continuous film", i.e. roll material that is successively unwound in the course of many injection molding operations. The film 4 is thereby guided through the mold 2 by way of a transporting device that is not shown in any more detail.

For producing the plastic part, the half mold 6 on the demolding side and a half mold 8 on the injecting side are moved in relation to each other in a moving direction 9 and thereby brought into the closed position as shown in FIG. 2. In the closed position there is formed between the half molds 6, 8 a cavity 10, which defines the shape of the plastic part. After the closing of the mold 2, the film 4 is pressed against the half mold 6 on the demolding side by an injection molding material, which is injected into the cavity 10 by way of an injection channel 11. The half mold 6 is therefore also referred to as a "half mold facing the film", while the half mold 8 is also referred to as the "half mold facing away from the film".

In the vicinity of the cavity 10, mold parting surfaces 14a and 14b, with which the half molds 6 and 8 are placed on each other in the closed position, are provided both on the half mold 6 on the demolding side and on the half mold 8 on the injecting side.

Figure 3:
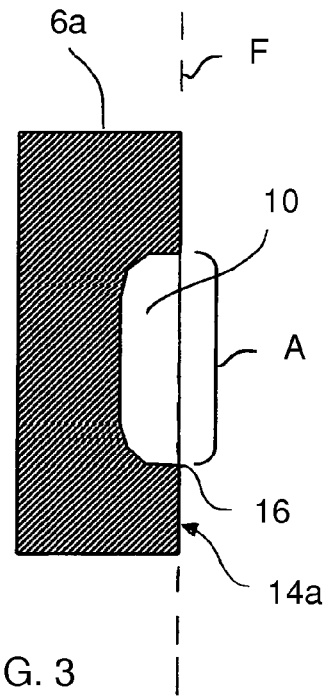
FIG. 3 is a cross-sectional view as shown in FIG. 1 of a half mold on a demolding side of a conventional IMD mold.

FIG. 3 shows the half mold 6a on the demolding side of a conventional IMD mold in the case of which the associated mold parting surface 14a lies in a mold parting plane F (here flat, i.e. not curved). An inner periphery 16 of the mold parting surface 14a encloses a surface area A, the cross section of which corresponds substantially to the cross section of the cavity 10.

By contrast with this, the mold parting surfaces 14a and 14b of the IMD mold 2 according to the invention respectively have on both half molds 6, 8 an inner region 12a or 12b, directly surrounding the cavity 10, and an outer region 13a, 13b, in turn surrounding the inner region. The outer region 13a, 13b defines by the alignment there of the mold parting surfaces 14a and 14b the mold parting plane F, which in the example represented is in turn flat and aligned perpendicularly to the moving direction 9. As a departure from this, the mold parting plane F may, however, also be aligned at a slope in relation to the moving direction 9 and/or be curved one-dimensionally, i.e. curved in one direction in a way similar to the lateral surface of a cylinder, while it is not curved in a direction perpendicular thereto.

In the inner region 12a, 12b, on the other hand, the mold parting surfaces 14a, 14b form a collar 15a or 15b set at a slope in relation to the mold parting plane F or at a slope in relation to the outer region 13a, 13b. The collar 15a of the half mold 6 on the demolding side consequently forms a funnel-like structure. As can be seen from the side view as shown in FIG. 1 and FIG. 4, the collar 15a on the demolding side forms a concave shape and the collar 15b on the injecting side forms a convex shape.

Figure 4:
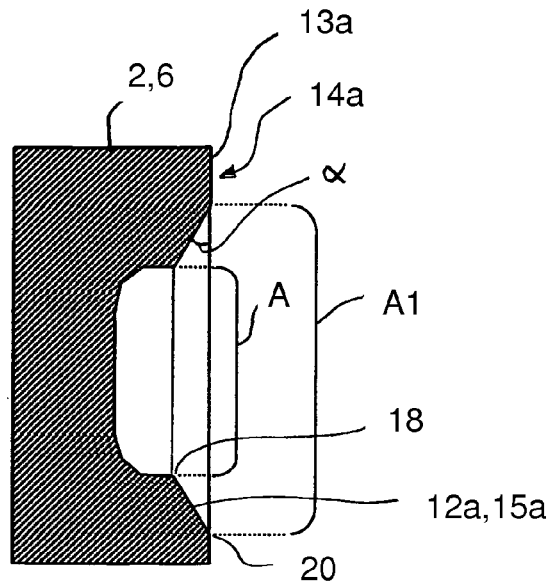
FIG. 4 is a cross-sectional view as shown in FIG. 1 of the half mold on the demolding side of the IMD mold there.
Figure 5:
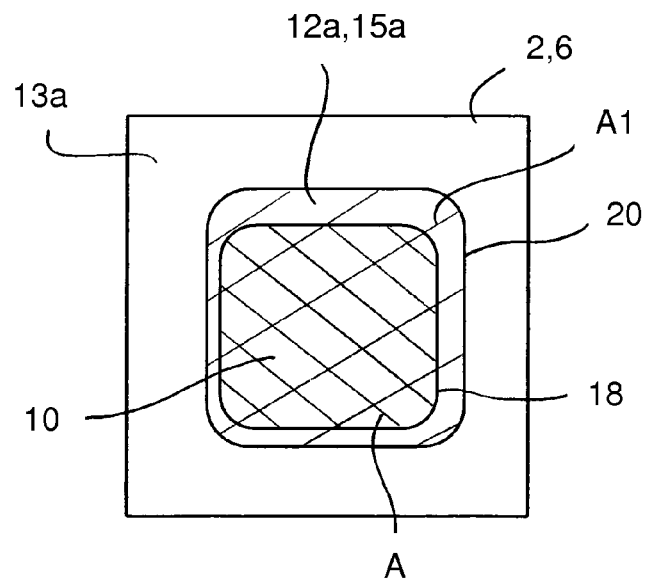
FIG. 5 is a plan view of the half mold on the demolding side of the IMD mold as shown in FIG. 1.

As can be seen in particular from FIG. 4, the collar 15a of the half mold 6 on the demolding side directly adjoins the cavity 10 with an inner periphery 18, and directly adjoins the outer region 13a of the mold parting surface 14a with an outer periphery 20. The outer periphery 20 encloses here a surface area $A_1$, while the inner periphery 18 encloses the smaller surface area A, corresponding to the cross section of the cavity 10. The ratio of the surface areas $A_1$ and A is varied, according to the size and contouring of the surface to be decorated, between a minimum value of approximately 1.75 and a maximum value of approximately 4. In the case of the mold 2 represented, this ratio is, for example, approximately 2.3.

The setting angle α (FIG. 4) of the sloping collar 15a, 15b with respect to the mold parting plane F is between 10° and 40°. In the exemplary embodiment shown, α=25°. In the simplified representation of the IMD mold 2 as shown in FIGS. 1, 2, 4 and 5, the setting angle α is constant around the circumference of the collar 15a, 15b. However, embodiments of the collar 15a, 15b in which the amount of the setting angle α varies around the circumference of the collar 15a, 15b are also possible.

The mold 2 also contains a means for generating a vacuum at a wall region 22 on the demolding side of the cavity 10. These means are formed in the region of the half mold 6 by vacuum channels 23, through which the air in the cavity 10 is sucked out, in particular while the mold 2 is still in the open position, so that the stretchable film 4 is thermoformed against the wall region 22. The vacuum channels 23 preferably do not open out here directly into the wall region 22 of the cavity 10, but into the collar 15a surrounding it. The vacuum channels 23 open out here into a pressure equalizing groove 24, which entirely or partially surrounds the inner periphery 18 of the collar 15a at a small distance.

For better stretching of the film 4, also provided in the exemplary embodiment represented is a heating device 25, which in the open position is moved in between the mold halves 6, 8. The heating device 25 may be an IR heater or alternatively a hot-air blower.

Figure 6:
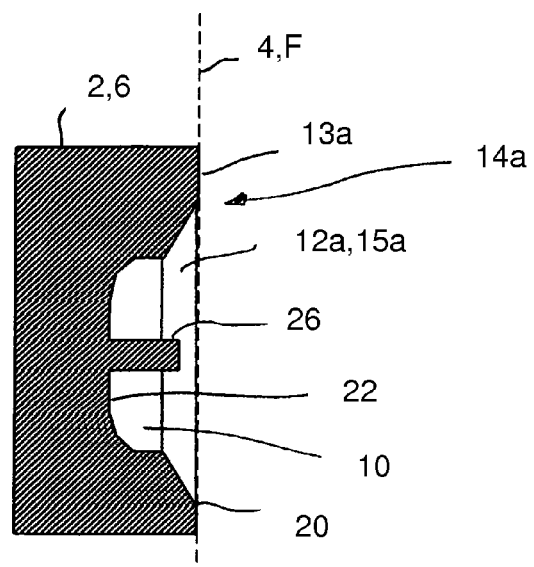
FIG. 6 is a cross-sectional view as shown in FIG. 1 of the half mold on the demolding side of a second embodiment of the IMD mold according to the invention.

In the case of an embodiment of the mold 2 represented in FIG. 6, formed on the wall region 22 of the cavity 10 is a projection 26, with the aid of which a window is produced in the plastic part. The collar 15a, 15b is dimensioned here in such a way that the projection 26 does not penetrate the surface area $A_1$ bounded by the outer periphery 20 of the collar 15a, and consequently also does not come into contact with the film 4 during insertion.

The production of the plastic part is performed in the following way: first, the film 4 is inserted in the open position of the IMD mold 2, is clamped in the outer region 13a of the mold parting surface 14a with the aid of a non-illustrated clamping frame and is heated by the heating device 25 (see FIG. 1). Subsequently, a vacuum is generated between the film 4 and the wall region 22 on the demolding side by way of the vacuum channels 23, as a result of which the film 4 is drawn against this wall region 22. In this thermoforming process, the film 4 is stretched at least approximately uniformly in the entire surface region with which it lies against the wall region 22 and against the collar 15a.

After the closing of the IMD mold 2 (see FIG. 2), the injection molding material is injected into the cavity 10 by way of the injection channel 11 and the plastic part is thus formed. After the injection molding compound has solidified, the IMD mold 2 is opened again. The plastic part is removed from the opened IMD mold 2 (demolded), the backing film being peeled off from the film 4. The backing film itself remains undamaged during the injection molding operation. In particular, the backing film is not punched or cut during the injection molding operation. By use of a transporting device, a new, intact part of the film 4, available as a continuous material, is inserted into the IMD mold 2 and clamped in place, whereupon the production operation is repeated.

In the case of the IMD mold 2 described above, effective stretching of the film 4 (decorated partial area, i.e. area of the wall region 22, divided by the cross section of the cavity 10) that far exceeds the local stretching of the film 4 (stretching of the film 4 per unit area) is achieved. In particular, effective stretching of over 100% can be achieved, without the film 4 tearing or developing folds.

Figures 7, 8:
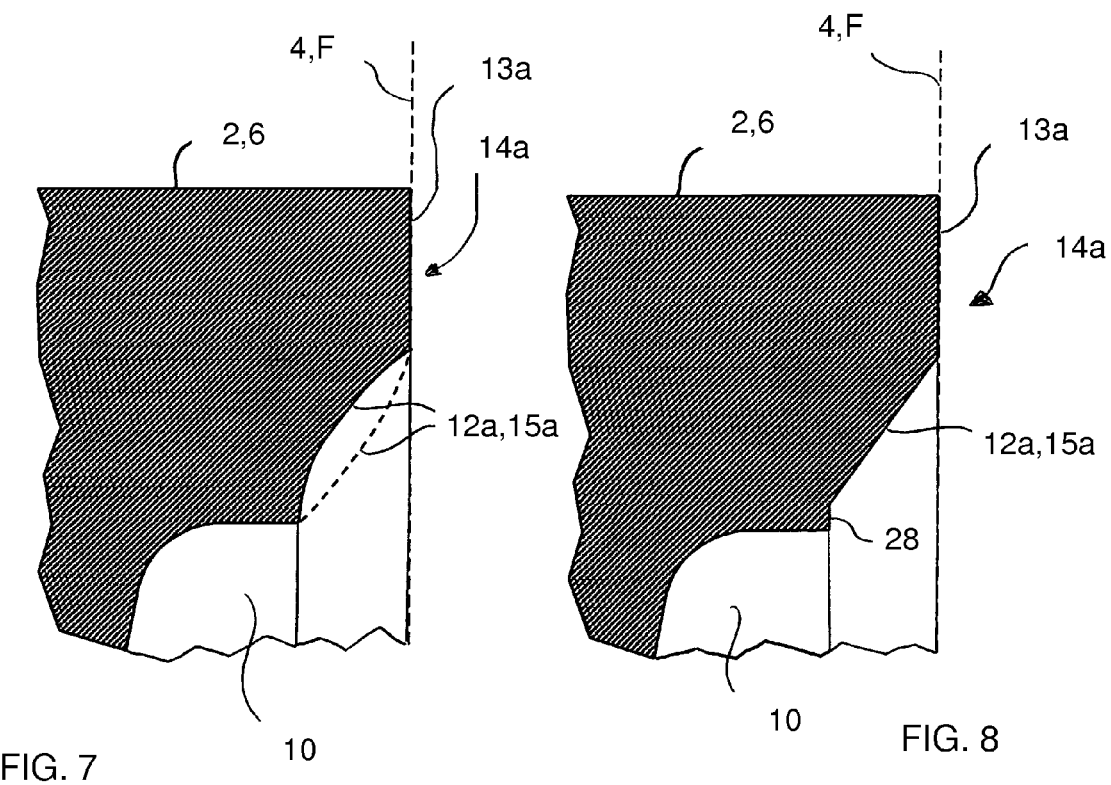
FIGS. 7 and 8 are enlarged, cross-sectional views showing details of various embodiments of a collar, forming an inner region of the mold parting surface, on the half mold on the demolding side of the IMD mold according to the invention.

Alternative embodiments of the collar are represented in FIGS. 7 and 8. Thus, in the case of the embodiment as shown in FIG. 7, the collar 15a does not run in a sloping straight line in cross section, but follows a cross-sectionally curved path. The curvature may in this case be concave or—as indicated by dashed lines—convex. Mixed forms, such as for example an S-shaped curvature, are also possible. As shown in FIG. 8, the collar 15a is in turn formed substantially by a cross-sectionally straight sloping surface. However, this sloping surface does not directly adjoin the cavity 10. Rather, an offset 28 is formed between the sloping surface and the cavity 10. In the case of all the embodiments described so far, the mold parting surface 14b of the half mold 8 on the injecting side is formed substantially to complement the mold parting surface 14 of the half mold 6 on the demolding side.

Figure 9:
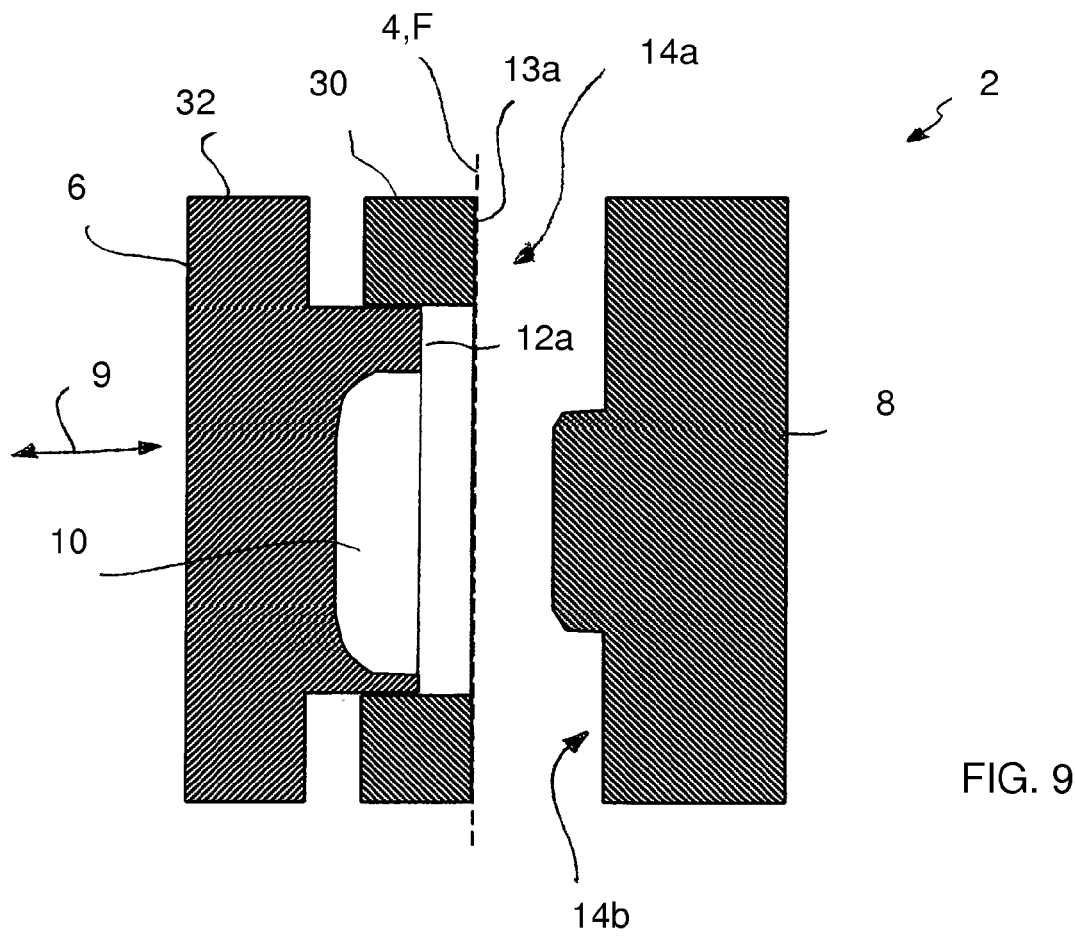
FIGS. 9 and 10 are cross-sectional views as shown in FIG. 1 of a further embodiment of the IMD mold according to the invention, in the open position and closed position respectively.
Figure 10:
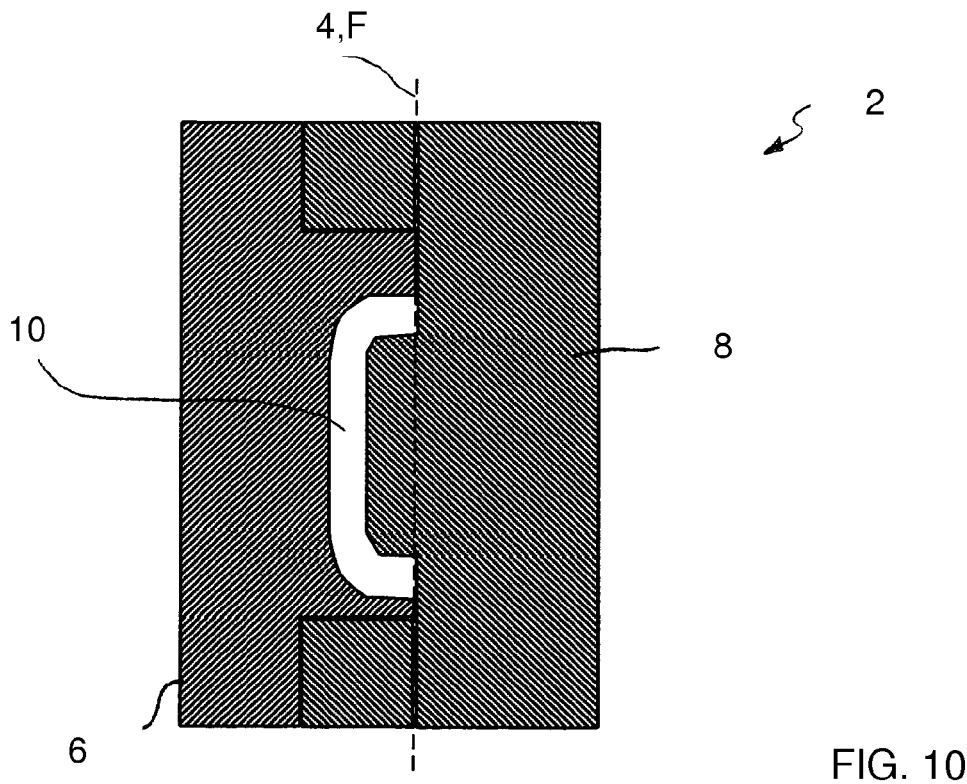

A further embodiment of the mold 2 according to the invention is represented in FIGS. 9 and 10. In the case of this embodiment, the half mold 6 on the demolding side is formed by two parts 30 and 32. Here, the outer region 13a of the mold parting surface 14a is formed on an annular outer part 30, while the inner region 12a of the mold parting surface 14a and the wall region 22 on the demolding side of the cavity 10 are formed on the second part 32. The two parts 30 and 32 are displaceable with respect to each other in the moving direction 9 in such a way that in the open position of the mold 2 the inner region 12a is set back from the outer region 13a and in the closed position of the mold 2 the inner region 12a and the outer region 13a lie in line in the mold parting plane F—also shown flat here by way of example.

The invention claimed is:

1. An in-mold decoration (IMD) mold for producing a film-decorated plastic part, the IMD mold comprising:
   a first half mold facing a film and having a mold parting surface;
   a second half mold facing away from the film and having a mold parting surface, said first and second half molds can be placed on each other along said mold parting surfaces and form between them a cavity being substantially closed off from an outside, said mold parting surface of said first half mold facing the film is formed by an inner region, surrounding said cavity, and an outer region, in turn surrounding said inner region, said outer region lying in a mold parting plane selected from the group consisting of an at least substantially flat mold parting plane and an one-dimensionally curved mold parting plane, said inner region being set back or can be set back from said mold parting plane;
   said mold parting surface of at least said first half mold facing the film forms, in said inner region, a collar which in cross section is set at a slope in relation to said mold parting plane; and
   said collar having a setting angle with respect to said mold parting plane of between 10° and 40°, and an amount of the setting angle varies around a circumference of said collar.

2. The IMD mold according to claim 1, wherein said first half mold facing the film has two parts, including a first part bearing said inner region of said mold parting surface, and a second part bearing said outer region of said mold parting surface, wherein said two parts are displaceable with respect to each other for setting back said inner region.

3. The IMD mold according to claim 1, wherein a ratio of surface area enclosed by an outer periphery of said inner region to a surface area enclosed by a periphery of said cavity lies between 1.75 and 4.

4. The IMD mold according to claim 1, wherein said first half mold facing the film has means for generating a negative pressure at an assigned wall region defining said cavity.

5. The IMD mold according to claim 4,
further comprising at least one vacuum channel; and
wherein at least one of said first and second half molds has a groove formed therein which entirely or partially surrounds said cavity and into which there opens out said at least one vacuum channel provided as the means for generating the negative pressure in said inner region of said mold parting surface of said second half mold facing the film.

6. The IMD mold according to claim 1, wherein said first half mold facing the film is provided with a projection which protrudes into said cavity but does not penetrate a surface area enclosed by said outer region of said mold parting surface.

7. An injection molding apparatus, comprising:
an in-mold decoration (IMD) mold containing:
a first half mold facing an IMD film and having a mold parting surface;
a second half mold facing away from the film and having a mold parting surface, said first and second half molds can be placed on each other along said mold parting surfaces and form between them a cavity which is substantially closed off from an outside, said mold parting surface of said first half mold facing the film is formed by an inner region, surrounding said cavity, and an outer region, in turn surrounding said inner region, wherein said outer region lies in a mold parting plane selected from the group consisting of an at least substantially flat mold parting plane and an one-dimensionally curved mold parting plane, said inner region is set back or can be set back from said mold parting plane;
said mold parting surface of at least said first half mold facing the film forms, in said inner region, a collar which in cross section is set at a slope in relation to said mold parting plane; and
said collar having a setting angle with respect to said mold parting plane of between 10° and 40°, and an amount of the setting angle varies around a circumference of said collar;
means for moving said IMD mold in a moving direction between a closed position and an open position; and
means for inserting the IMD film between said first and second half molds.

8. The injection molding apparatus according to claim 7, further comprising a heating device, which in the open position of said IMD mold can be moved between said first and second half molds.

9. The injection molding apparatus according to claim 7, further comprising means for clamping in the IMD film, which are disposed in said outer region of said mold parting surface of said first half mold facing the film.

* * * * *